United States Patent Office 3,573,226
Patented Mar. 30, 1971

3,573,226
MOLYBDENUM-CONTAINING CATALYST SOLUTIONS AND METHOD OF MAKING AND USING SAME
Harold A. Sorgenti, Drexel Hill, Pa., assignor to Atlantic Richfield Company, New York, N.Y.
No Drawing. Continuation-in-part of application Ser. No. 647,941, June 22, 1967. This application Apr. 2, 1969, Ser. No. 812,845
Int. Cl. C07d 1/08
U.S. Cl. 252—431                              3 Claims

ABSTRACT OF THE DISCLOSURE

Method for the preparation of molybdenum-containing epoxidation catalyst solutions by heating molybdenum powder with a stream containing unreacted tertiary butyl hydroperoxide used in the epoxidation process as the oxidizing agent and polyhydric compounds of from about 200 to 300 molecular weight and having from 4 to 6 hydroxyl groups per molecule, the polyhydric compound being formed as a by-product in the epoxidation process, the catalyst solution produced by such method and olefin epoxidation processes utilizing such catalyst solutions as the catalyst therefore.

RELATED APPLICATION

This application is a continuation-in-part of application Ser. No. 647,941 filed June 22, 1967 entitled Molybdenum-Containing Catalyst Solutions and Method of Making and Using Same, now abandoned.

BACKGROUND OF THE INVENTION

Field of the invention

The present invention relates to a method for the production of molybdenum-containing catalyst solutions by incorporating metallic molybdenum in the distillate bottoms of an epoxidation reaction product and thereafter heating the mixture. It also relates to the catalyst solution made by this method and to the olefin epoxidation process utilizing such method and catalyst solution.

PRIOR ART

No prior art is known which relates to the instant method of producing molybdenum-containing catalyst solutions and to the catalyst solution produced thereby. The closest art known to the inventor is U.S. Pat. No. 3,434,975 (1969) to Sheng et al., entitled "Molybdenum-Containing Catalyst and Method for the Preparation Thereof" wherein there is shown a method of making a molybdenum-containing epoxidation catalyst by reacting molybdenum metal with a peroxy compound such as an organic hydroperoxide in the presence of a $C_1$–$C_4$ saturated monohydric or dihydric alcohol.

It is shown in this application that methanol gives superior results with respect to the quantity of molybdenum which is solubilized and as the molecular weight of the alcohol increases the amount of molybdenum which is solubilized decreases rather markedly such that with tertiary butyl alcohol only a very small amount of molybdenum is solubilized.

Similarly, it is stated that ethylene glycol is effective in solubilizing the molybdenum when used in combination with the hydroperoxide and while propylene glycol also may be used the higher molecular weight dihydric compounds such as a $C_8$ diol are substantially ineffective.

The present invention differs from this method in that the molybdenum metal is treated with a bottoms fraction of an epoxidation reaction mixture which is catalyzed by a molybdenum-containing catalyst and wherein an organic hydroperoxide is utilized as the oxidizing agent. The bottoms fraction is obtained by distilling the reaction mixture to remove unreacted olefin, the olefin oxde and most of the alcohol which is produced in the epoxidation reaction by the reduction of the corresponding hydroperoxide. The bottoms fraction contains undecomposed hydroperoxide, higher boiling by-products from the epoxidation reaction and used molybdenum catalyst.

The higher boiling by-products from the epoxidation reaction have been found to be high molecular weight polyhydric compounds and since the only low molecular weight alcohol present in the bottoms fraction is the alcohol produced from the hydroperoxide which is very poor for solubilizing molybdenum and since there are little if any $C_2$–$C_4$ glycols in the bottoms fraction it is completely unexpected that the high molecular weight polyhydric compounds can be utilized in combination with the organic hydroperoxide to solubilize the molydenum and produce a molybdenum catalyst solution.

The catalysts of the instant invention are suitable for the epoxidation of olefinically unsaturated compounds utilizing an organic hydroperoxide as the oxidizing agent. In particular, they are useful in accordance with the method set forth in detail in Belgian Pat. No. 674,076, dated June 20, 1966.

SUMMARY OF THE INVENTION

In accordance with the present invention metallic molybdenum is reacted with the bottoms fraction obtained as a by-product from the epoxidation reaction of an olefin with an organic hydroperoxide in the presence of a molybdenum-containing catalyst. There is obtained by this reaction a molybdenum-containing catalyst solution which can be used as the catalyst either in the same epoxidation reaction which produced the original bottoms fraction, i.e. a recycle operation, or in any epoxidation reaction wherein an olefinically unsaturated compound is reacted with an organic hydroperoxide to produce an oxirae compound.

It is an object of this invention, therefore, to provide a method for the production of economical and efficient molybdenum-containing catalyst solutions useful in the production of oxirane compounds from olefinically unsaturated compounds.

It is another object of this invention to provide a method for the production of molybdenum-containing catalyst solutions from a bottoms fraction of an epoxidation process.

It is another object of this invention to provide a method for the epoxidation of olefins wherein at least a portion of a bottoms fraction of the olefin epoxidation reaction product is reacted with metallic molybdenum to produce a catalyst solution which is recycled to the olefin epoxidation step.

It is another object of this invention to provide molybdenum-containing catalyst solutions useful in the production of oxirane compounds from olefinically unsaturated compounds.

Other objects of the invention will be apparent from the description of the preferred embodiments and from the claims.

DESCRIPTION OF THE PREFERRED EMBODIMENTS

The metallic molybdenum which is employed in the present invention is preferably molybdenum powder since this form of the metal provides the largest surface per unit weight of the metal, thereby facilitating the reaction with the epoxidation reaction bottoms fraction. The powdered metallic molybdenum is available commercially, for example, in 80–200 mesh particle size. The particle size, however, is not critical since the powder is preferred merely because it reacts faster. Particles up to about 1 millimeter in diameter are acceptable but particles below about 0.1 millimeter are somewhat more preferable, but it will be clear that this is not a limiting feature of the invention. Other forms of the metal such as sheet, strips, rods, lumps and the like require longer reaction times to obtain the molybdenum solution and consequently are not preferred.

The epoxidation reaction from which the bottoms fraction is obtained may be, in general, one wherein an olefinically unsaturated compound is reacted with an organic hydroperoxide in the presence of a solution molybdenum catalyst.

In a preferred embodiment, however, the reaction of propylene with tertiary butyl hydroperoxide in the presence of a molybdenum catalyst solution is used as the source of the reaction mixture bottoms. In this reaction there is produced a reaction mixture consisting of unreacted propylene, unreacted tertiary butyl hydroperoxide, propylene oxide product, tertiary butyl alcohol which is produced by the reduction of the tertiary butyl hydroperoxide, acidic compounds, other peroxy compounds, high molecular weight polyhydric compounds in the range of 200 to 300 molecular weight and used molybdenum catalyst.

The propylene epoxidation process is carried out at a temperature in the range of from about 180° F. to 300° F. and under pressures in the range of from 300 p.s.i.g. to 1000 p.s.i.g. and preferably at temperatures in the range of from about 220° F. to 280° F. and under pressures preferably from 500 p.s.i.g. to 800 p.s.i.g. In general a catalyst concentration ranging between 20 p.p.m. and 1000 p.p.m. of molybdenum by weight based on the weight of propylene-free liquid in the reaction is suitable for carrying out the reaction while a concentration in the range of 50 p.p.m. to 500 p.p.m. of molybdenum by weight based on the weight of the propylene-free liquid is preferred.

This reaction mixture is distilled to remove the propylene, propylene oxide and most of the tertiary butyl alcohol. The bottoms fraction thus contains only a small amount of the tertiary butyl alcohol together with the unreacted tertiary butyl hydroperoxide, acidic compounds, polyhydric compounds and used catalyst.

In general the amounts of these materials in the bottoms fraction can vary quite widely depending upon the manner in which the reaction is carried out. In most instances the tertiary butyl hydroperoxide will range between 5 weight percent and 30 weight percent of the fraction, the tertiary butyl alcohol from 25 weight percent to 55 weight percent, the high molecular weight polyhydric compounds from 10 weight percent to 55 weight percent and the acidic and other peroxy compounds from 4 weight percent to 8 weight percent.

To this residual fraction molybdenum powder is added and the mixture heated to a temperature in the range between 140° F. and the reflux temperature (at atmospheric pressure) of the mixture for a time in the range of 0.5 to 7 hours with from 0.5 to 2.0 hours usually being sufficient. In general, the reflux temperature of the mixture is approximately 190° F., however, if there is a high proportion of high boiling compounds in the bottoms fraction the reflux temperature may be as high as 198° F. to 200° F. or more. The reaction mixture is filtered and the resultant filtered solution is the molybdenum catalyst solution which is useful in catalyzing the oxidation of olefinically unsaturated compounds by an organic hydroperoxide oxidizing agent.

In a particularly preferred embodiment of the invention this catalyst solution is recycled to the propylene epoxidation step. When recycle is employed only a portion of the total bottoms fraction is required for producing additional catalyst for recycle. Although the entire bottoms fraction can be used to make catalyst, if only that portion is used which is required to produce sufficient catalyst solution for recycle, build-up of high molecular weight polyhydric compounds in the epoxidation reaction is prevented.

The amount of the bottoms fraction required is that which will provide the molybdenum concentration in the epoxidation reaction which has been set forth, i.e. a concentration ranging between 20 p.p.m. and 1000 p.p.m. of molybdenum by weight based on the weight of propylene-free liquid in the reaction. In order to obtain a catalyst solution which will provide this necessary concentration it has been found that it is necessary to have a weight ratio of molybdenum metal to hydroperoxide in the bottoms fraction in the range of from about 1:5 to 1:40 with a ratio of 1:10 to 1:30 being somewhat more preferred. In addition, it has also been found that the weight ratio of molybdenum powder to the high molecular weight polyhydric compounds should be between about 1:5 and 1:200 with excellent results being obtained at ratios between 1:15 and 1:30. Since both the hydroperoxide and high molecular weight polyhydric compounds are necessary to solubilize the molybdenum powder to make the catalyst solution the weight ratio of molybdenum to each of these components has been specified since the ratio of hydroperoxide to high molecular weight polyhydric compounds can vary in the bottoms fraction in accordance with the reaction conditions being employed in the epoxidation reaction. In general, they will be within the ranges which have been set forth.

Thus, for example, if the molybdenum in the catalyst solution were at a concentration of 2500 p.p.m. by weight and it was desired to maintain the epoxidation reaction at a catalyst concentration of 100 p.p.m. in the propylene-free liquid then the amount of catalyst solution would be about 0.04, the amount of the propylene-free liquid. Generally, these concentrations are expressed in parts by weight. Likewise, if the catalyst solution were made to contain 10,000 p.p.m. and it was desired to have a catalyst concentration of 100 p.p.m. in the propylene-free liquid of the epoxidation reaction, then the amount of catalyst liquid required would be about 0.01, the amount of the propylene-free liquid in the reaction.

The liquid in the epoxidation reaction mixture is preferably expressed on a propylene-free basis for the obvious reason that the amount of propylene will vary with temperature and pressure utilized in the reaction since propylene is a gaseous compound at ambient conditions.

The following examples are provided to illustrate the invention in greater detail and to illustrate preferred embodiments of the invention. It will be understood, however, that these examples are not to be construed as limiting the invention thereto.

EXAMPLE I

A bottoms fraction was obtained from an epoxidation reaction mixture wherein propylene was converted to propylene oxide utilizing tertiary butyl hydroperoxide as the oxidizing agent in the presence of a molybdenum-containing catalyst solution. The bottoms fraction was obtained by distilling the reaction mixture to remove unreacted propylene, the propylene oxide product and some of the tertiary butyl alcohol produced by reduction of the tertiary butyl hydroperoxide. The bottoms fraction was analyzed and found to contain 26 weight percent unreacted tertiary butyl hydroperoxide, 48 weight percent tertiary butyl alcohol, 1.2 weight percent water, 6.0 weight percent acidic compounds, 5.2 weight percent allyl tertiary butyl peroxide, 1.2 weight percent isobutyl alcohol, 0.3 weight percent other alcohols, 12.1 weight percent high molecular weight polyhydric compounds and approximately 700 p.p.m. molybdenum in the form of the used catalyst. The "high molecular weight polyhydric compounds" as they will be referred to hereinafter and in the claims have a molecular weight in the range of from about 200 to 300 with an approximate elemental analysis of carbon—59 weight percent, hydrogen—10 weight percent and oxygen—31 weight percent. This analysis corresponds to a formula ranging from $C_{10}H_{20}O_4$ to $C_{15}H_{30}O_6$ indicating these compounds have from 4 to 6 hydroxyl groups per molecule.

To each 100 grams of this bottoms fraction was added 0.8 gram of powdered molybdenum. This mixture was refluxed for one hour and thereafter filtered. The filtrate when analyzed and after correcting for the original quantity of molybdenum present in the bottoms, showed that substantially all of the molybdenum which had been added was dissolved. This demonstrates the surprising discovery of this invention; namely, that the high molecular weight polyhydric compounds in the bottoms fraction are completely effective in solubilizing molybdenum to produce a molybdenum catalyst solution.

This catalyst was tested in batch equipment for the epoxidation of propylene and compared with standard runs made under the same conditions utilizing a standard soluble molybdenum catalyst prepared by reacting molybdenum metal with fresh propylene glycol and fresh tertiary butyl hydroperoxide with tertiary butyl alcohol as the solvent, i.e. the catalyst of the afore-mentioned application Ser. No. 516,778. A reaction temperature of 265° F., a pressure of 650 p.s.i.g., a reaction time of one hour, a catalyst concentration of 90 p.p.m. based on the total volume of reactants and a propylene concentration of 45 weight percent was employed.

In four runs the percent conversions based on moles of charged were 87, 85, 94 and 96. In these same four runs the percent selectivities based on moles of propylene oxide produced per mole of hydroperoxide converted were, respectively, 89.5, 83, 87 and 82.5.

In the two standard runs made for comparison purposes the conversion was 86 percent and 95 percent with selectivity of 87.5 percent and 85 percent. These data demonstrate that the catalyst solution of the instant invention is equivalent to soluble molybdenum catalysts.

EXAMPLE II

A number of other catalysts were prepared by reacting molybdenum powder with the bottoms fraction resulting from the conversion of propylene to propylene oxide utilizing tertiary butyl hydroperoxide as the oxidizing agent and the molybdenum catalyst solution prepared from propylene glycol and tertiary butyl hydroperoxide. It will be understood, however, that any other soluble molybdenum catalyst such as molybdenum naphthenate, molybdenum hexacarbonyl, etc. may be used to carry out the initial epoxidation which produces the high molecular weight polyhydric compounds. The amount of tertiary butyl hydroperoxide in the bottoms fractions was varied from 13 weight percent to 35 weight percent along with the amount of tertiary butyl alcohol which was varied from about 25 weight percent to 55 weight percent with the amounts of high boiling, high molecular weight polyhydric compounds varying from about 10 weight percent to about 53 weight percent. In addition to varying the quantities of reactants, reaction times from 0.5 to 7 hours were employed with temperatures ranging from 140° F. to reflux temperatures. In each case the amount of powdered molybdenum added was 0.8 gram per 100 grams of bottoms in order to obtain a variation in the ratio of molybdenum metal to hydroperoxide and to the high molecular weight polyhydric compounds. In all cases substantially all of the molybdenum was dissolved to produce an effective molybdenum epoxidation catalyst solution.

It was found that all of these catalysts are completely effective both with respect to conversion and selectivity for catalyzing the propylene oxidation to produce propylene oxide with tertiary butyl hydroperoxide.

Since the bottoms fraction contains a molybdenum catalyst which has been used for the epoxidation reaction, the process wherein additional molybdenum is reacted with the bottoms fraction can be considered one of fortification followed by recycle. Since the epoxidation of propylene can be carried out in a continuous system for this fortification process is particularly suitable for producing catalyst solutions which can be recycled to the process.

EXAMPLE III

In order to demonstrate the feasibility of utilizing the molybdenum-containing catalyst solutions of this invention in a continuous olefin epoxidation process a catalyst solution was prepared in the manner set forth in Example I from a propylene epoxidation reaction product bottoms fraction of a propylene epoxidation process similar to that described in Example I. The catalyst solution thus prepared had a molybdenum concentration of 5600 p.p.m. This solution was introduced into a continuous propylene epoxidation process wherein the reaction conditions were a temperature of 250° F., a pressure of 600 p.s.i.g., a flow rate of 90 cc. per hour of tertiary butyl hydroperoxide and 150 cc. per hour of propylene. There was maintained a molybdenum concentration of 330 p.p.m. based on the quantity of propylene-free liquid in the reaction. There was obtained a conversion of 81 percent based on moles of hydroperoxide converted per mole of hydroperoxide charged and a selectivity of 75 percent based on moles of propylene oxide produced per mole of hydroperoxide charged. This experiment shows that the catalyst produced in accordance with this invention may be produced from and recycled to a continuous process.

I claim:

1. A method for the preparation of molybdenum-containing catalyst solutions useful as a catalyst for the epoxidation of an olefinically unsaturated compound which comprises heating powdered metallic molybdenum with tertiary butyl hydroperoxide and polyhydric compounds having a molecular weight in the range from about 200 to 300 and having from 4 to 6 hydroxyl groups per molecule, said compounds being produced in a molybdenum catalyzed olefin epoxidation process wherein tertiary butyl hydroperoxide is employed as the oxidizing agent, said hydroperoxide and polyhydric compounds being separated as a botoms fraction from a said molybdenum catalyzed olefin epoxidation process, said powdered metallic molybdenum being in an amount such that the weight ratio of said molybdenum metal to said hydroperoxide is in the range of from about 1:5 to 1:40 and the weight ratio of said molybdenum metal to said polyhydric compounds being in the range between about 1:5 and 1:200, said heating being at a temperature in the range of from 140° F. to the reflux temperature of said bottoms fraction for a time ranging from 0.5 to 7.0 hours.

2. The method according to claim 1 wherein the olefinically unsaturated compound is propylene.

3. The molybdenum catalyst solution prepared in accordance with the method of claim 1.

References Cited

UNITED STATES PATENTS 3,351,635 11/1967 Kollar _____ 260—348.5
3,434,975 3/1969 Sheng et al. _____ 252—431
3,480,563 11/1969 Bonetti et al. _____ 252—431

PATRICK P. GARVIN, Primary Examiner

U.S. Cl. X.R.

252—430; 260—348.5